United States Patent Office 2,857,630
Patented Oct. 28, 1958

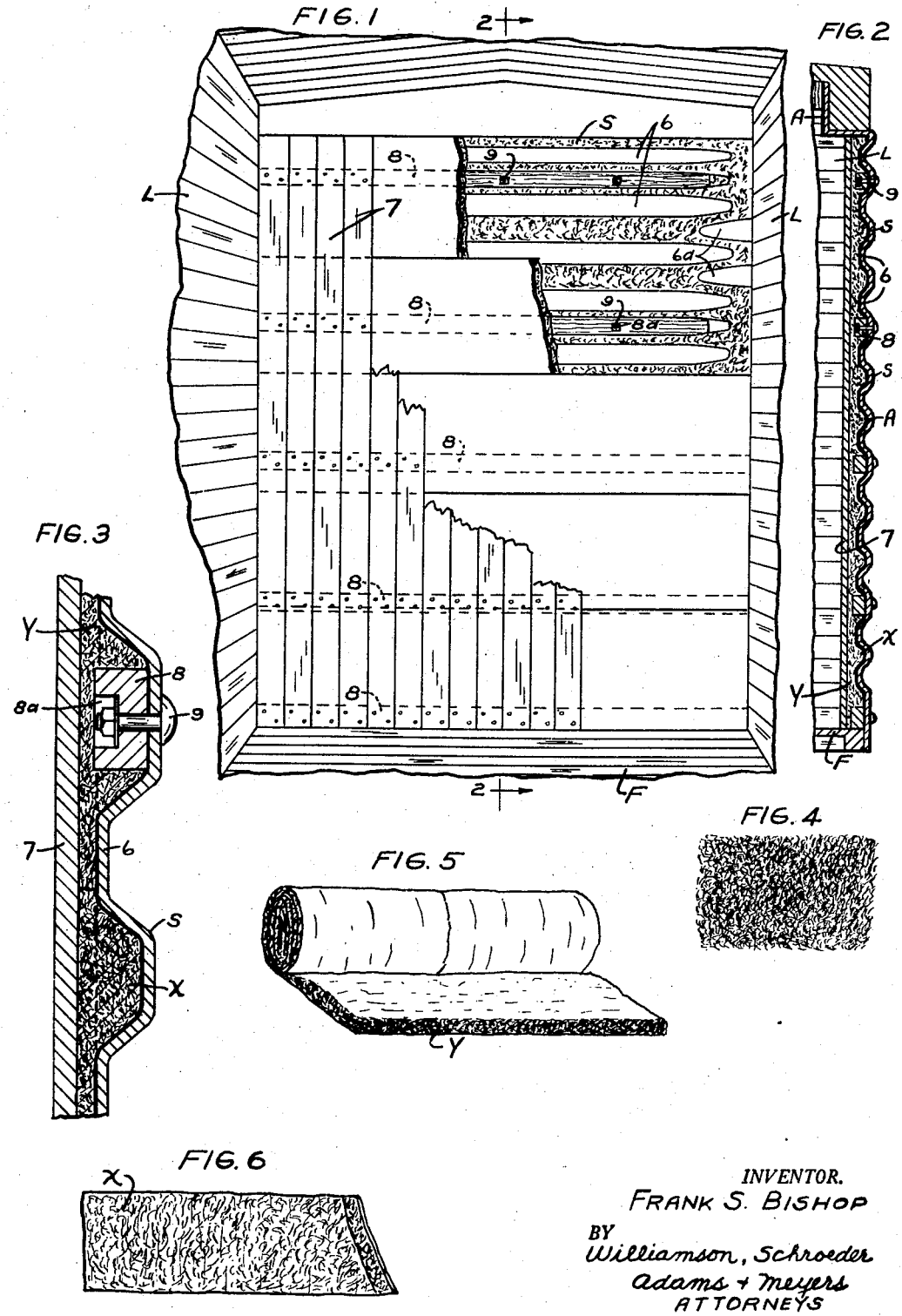

2,857,630

SYSTEM FOR SUBSTANTIALLY ELIMINATING INSECT INFESTATION IN CARS, BINS AND THE LIKE

Frank S. Bishop, Minneapolis, Minn.

Application December 9, 1955, Serial No. 552,209

5 Claims. (Cl. 20—4)

This invention relates to the substantial prevention of insect infestation and colonization in boxcars, trucks and bins utilized for the shipment and storage of various food products such as grain, milled products, fruit and prepared foods.

This application is a continuation-in-part of my copending application, Serial Number 169,453, filed June 21, 1950 (but now abandoned).

For many years, millers, bakers, flour and grain shippers and prepared food manufacturers have been concerned with the colonization of insect infestation in boxcars, other transportation vehicles and bins wherein grain, milled products, fruits and other food stuffs were committed for hauling or temporary storage.

In recent years, fumigation, residual type sprays and other methods have been tried in an effort to combat infestation and colonization of insects and larvae. One recent advancement made in boxcars has been the creation of a grain channel between the liner or inner wall construction usually formed from flooring and the outer walls of the car by removal of the bottom board or boards at the side of the car, enabling the accumulated grain dust or other organic material to be blown downwardly and swept from the areas on the sides of the car. Thereafter, before use, the car could be fumigated with a residual type spray.

The foregoing improvement however, was impossible to carry out on the car ends since on most commercial boxcars, the end liner boards are applied in a vertical position with the nailing stripe running in a horizontal position behind the end liner and the actual end walls of the car are usually constructed of corrugated steel furnishing rather deep grooves or recesses forming an ideal lodging place for flour dust, solid grain and organic material which sifts through the wood liner. A vast amount of material due to flexing and jolting of the cars in travel accumulated in such spaces at the end of the car and since this material is behind the wood liner to the interior of the car and the inside face of the corrugated steel end, is not readily removable because it cannot be reached by air or sweeping or by any practical fumigating or spraying treatment.

It is an object of my invention to provide a simple, comparatively inexpensive but highly efficient method of filling the space behind the liners of boxcars, other transportation vehicles and storage bins for grain, milled products and food stuffs which will substantially exclude the penetration thereof by comminuted organic material and insects and which will further provide a medium and barrier of densely matted, resilient fibers through which insects such as grain beetles, carpet beetles, grain borer, weevils and meal worms cannot pass, said barrier immobilizing and hence leading to the starvation of insects if the same can penetrate the outermost layer of the barrier.

Another object is the provision of a physical system or apparatus for carrying out the prevention of colonization of insects and larvae which is adapted for ready installation in boxcars, trucks and bins or containers having liners.

Still another object is the provision of a method and apparatus which utilize for an insect barrier, a mass composed of myriads of highly elastic fibers positioned and tensioned to form a meshwork or tangle whereby few individual fibers can move without changing strain values of other fibers resulting in a tendency of each fiber to move to a position of lower stress whereby with the vibrations of railroad cars the mass completely fills all available space being under the optimum tension and equalization of strain pressures is brought about resulting in such a dense meshwork that insects of the class described cannot penetrate the barrier and if they attempt to do so, will be immobilized or injured, resulting in death.

More specifically, it is an object to provide a method and apparatus of the class described wherein the available lodging and nesting spaces for infestation insects and their larvae are completely filled by a dense matting of very resilient or elastic, relatively hard, fibrous material having in the matted structure, myriads of sharp cutting or piercing ends which cut or prick the sensitive portions including joints of insects such as weevils, worms, beetles and the like, thereby causing subsequent loss of fluid vital to insect life. My method and apparatus further includes the compression and maintenance of the filler mass in a relatively dense, elastic state under tension.

These and other objects and advantages of my invention will more fully appear from the following description made in connection with the accompanying drawings wherein like reference characters refer to similar parts throughout the several views and in which:

Fig. 1 is a perspective view of the interior of a railroad boxcar looking in the direction of one of the ends thereof which has installed thereon my improved systems, portions of the successive layers of liner, filler material, nailing strips and coating being successively broken away to show the successive steps of my method;

Fig. 2 is a vertical section taken on the line 2—2 of Fig. 1;

Fig. 3 is a detail fragmentary view section similar to Fig. 2, taken on a much larger scale;

Fig. 4 is a microscopic cross section view taken through a fragment of the matted fibrous filler material prior to compression and installation thereof;

Fig. 5 is a perspective view of a roll of the matted fibrous material before cutting and application to the ends of the boxcar; and Fig. 6 is a top plan view of a strip of the fibrous material cut for insertion in one of the corrugations of a boxcar end.

As shown in the drawings, my method and apparatus is applied to one of the ends of the boxcar although it will be understood that if desired, application may be made to the sides, ceiling and floor of the car although this is not necessary in railroad cars to obtain my desired results. The car illustrated in Fig. 1 is provided with the usual floor F and side liner boards L which usually are in the form of flooring tongued and grooved for tight connection between the horizontally disposed members.

The end of the boxcar illustrated is of the usual conventional structure comprising a heavy steel sheet S provided with horizontal corrugations 6 which are arranged as shown in the upper portion of Fig. 1 and include complementary corrugations 6a extending inwardly from the side edges of the car end. The grooves on the inside of the car between the horizontal corrugations or ribs in ordinary practice, become filled in a short time with dust particles of whole grain and organic matter which work through the interstices between the vertical liner boards 7 which are conventionally used. In fact, the weaving and jolting of the car during transit in conventional structure causes a breathing action which materially assists the penetration of dust particles, insect larvae and small insects through the cracks between the joints of the vertical liner sections.

My system, preferably but not necessarily, includes upon the inner corrugated surface of the car or bin end, and if desired upon the side wall, ceiling and floor construction, a relatively thick coating of asphalt emulsion A of a sticky nature which acts as a protection against corrosion and a deterent to the possible passage of insects behind the later applied filler material.

While this coating which completely covers the wall to be protected is still adhesive in nature, I apply thereto a complete covering on the inside of the car or bin of densely matted, highly resilient, relatively hard fibrous material such as a fibrous glass. Fibrous glass of the type employed of resilient, fine and relatively long fibers has been found highly successful for the purposes of my invention. Certain other intermatted, elongated, highly resilient mineral fibers may be successfully used if they have the characteristics, when under optimum pressure or tension and subject to vibration of mobility to uniformly fill a predetermined space forming a dense, tangled meshwork. Elastic, relatively long fibers obtained through the dry spinning of slag and dolemite lime has been found highly satisfactory. The slag used usually is obtained from blast furnaces as a waste product and in its manufacture for the purposes of my invention, is dry spun and intermatted into a flexible blanket which must be rather densely compressed for my purposes. The material used preferably should have in addition to relatively long, resilient fibers, the provision of myriads of sharp ends or pointed extremities which are present throughout the mass and at the external surfaces of the filler. Such fibrous, highly resilient materials are available in the form of blankets usually obtainable in rolls with a strip of paper separating the convolutions and rolled therewith under tension and ordinarily in loose form before being compacted, having a density approximating three pounds to the cubic foot. Such a roll is illustrated in Fig. 5 and in unrolled and uncompressed state, has a thickness varying between two to six inches but through the inherent nature of the material, may be compressed to a dense thickness of as little as less than one half inch.

The rolls, to facilitate handling and attachment thereof are of a convenient width, for example, 24 inches and may be cut to length for the width of the standard boxcars which in many instances is approximately 117 inches.

Boxcars are ordinarily equipped with spaced nailing or filler strips 8 which may be bolted or otherwise secured within three, four or more of the spaced corrugations at the inside of the car, said strips ordinarily being boards which are disposed horizontally in parallel relation and fill the greater part of the respective corrugations in which they are applied.

In carrying out my method and utilizing my system after preferably (not necessarily) applying the asphalt coating A to the steel end of the car (interior surface) strips approximately 8 inches wide of the full thickness of the material (preferably precut) are applied and stuffed into the unfilled corrugations from the interior of the car. The resiliency of the fibrous, wholly intermatted materials are such that these strips will retain their positions until the next step of my method is carried out.

Next, a blanket Y of the said fibrous, resilient material is carefully laid transversely across the interior of the car end and may be smoothly disposed and tacked at spaced intervals for preliminary retention by use of shingle nails or large headed roofing nails and traversing the width of the car end. Thereafter, additional blankets are disposed in close abutment to those previously attached until the interior of the end of the car is completely covered with the fibrous material, the blankets or fibrous material of course covering the nailing strips and narrow, fibrous strips X.

The liner boards 7 usually disposed vertically are then interfitted, applied to and nailed or screwed to the respective nailing strips.

In doing this, the closely intermatted, highly resilient fibrous material is materially compressed to the extent that after vibration of the car through travel, the density of the fibrous material is increased over four-fold, often being as high as 15 to 16 pounds per cubic foot. The liner boards are applied in the manner of flooring, wedge or fastening the last two or three strips or engaging the tongues or grooves and thereafter forcing the strips inwardly and slightly angularly to precisely fill the remaining space at one side of the car end.

Because of the inherent, highly resilient and expansive nature of the particular fibrous materials utilized, all space and all recesses rearwardly of the smooth-faced liner are filled and pressure on the material becomes uniform due to the high mobility and elastic nature of the intermatted fibers.

It is very essential that unlike the use of fibrous material in insulation, there be no vapor seal or sheet between the compressed barrier blanket and the liner boards or the corrugated steel end of the structure.

The blanket becomes a highly efficient filter and barrier and breathes through vibration on the car in transit.

In fact, even when the car is not under motion, the stress on the individual fibers is such that there is constant mobility of the fibers with the result that dust, larvae and insects, if the same penetrate between the joined edges of the liner boards, are entrapped as in a web and the insects subjected to the damage and cutting of the hard, resilient fibers and the relatively sharp ends thereof. The compression of the material of course brings into closer relation the interpositioning of myriads of hard fiber ends as well as the proximity of the individual, intermatted fibers longitudinally.

Glass fibers and relatively long fibers made by spinning mineral such as slag have been found ideal products for my particular purposes. After the blankets are applied or tensioned or compressed, as previously stated, vibration or mobility of the fibers, due to sonic vibrations, jarring or travel of the car or bin cause the fibers to become mobile and move to positions of lesser tension. Since the meshwork is a thorough tangle of relatively long fibers, few individual fibers can move without changing strain values of other fibers. The result of the summation of the tendency of each fiber to move to a position of lower stress is of course that the pad or mass increases in size and since in my structure and method the pad is compressed and has only a limited space in which to move, the end result is the complete filling of all available space including cracks between the liner boards and equalization of strain pressures throughout the path and this will be a continuing process with subsequent vibrations, jars and temporary displacements. The fibrous glass has high value of elasticity and relatively smooth surfaces making the overall resiliency great. Insects which attempt to penetrate the barrier become incased in a cell or compartment of fibrous glass web which will immobilize the insect until it starves.

Inspection of cars provided with my system after continuous use for substantially a year's time show that the compressed filler material is penetrated by flour dust and fine organic matter only at the surface next to the board car liner and for perhaps an 8th of an inch to 3/16 of an inch inwardly thereof, the action of the dust in the densely matted fibers serving to clog the thin stratum next to the liner boards to prevent further passage of finely comminuted organic material towards the end of the car. Thus, with my method and apparatus, the compressed, elastic filler material adhered to the asphalt coating on the interior surface of the metal end wall of the car acts as a barrier to fine dust and comminuted organic material.

In this connection, it is desirable to utilize a material which is relatively non-hygroscopic and which is so intermatted that it will not settle with the jolting and shocks a railroad car incurs in travel. It is of course clearly understood that the blanket fibrous material must have loose intermatted fibers rather than a blanket or batt where any resinous material is used to partially connect or bond the fibers together. Mobility of the individual fibers as recited, when under compression and subjected to vibration, is a very essential factor of the invention.

Where hereafter in the claims, the term "glass fibrous material" or "glass fibers" is utilized, it definitely includes blankets of material spun from silaceous materials such as furnace slag and the like where the spinning produces highly resilient individual fibers of at least medium length and where no resinous material is employed, to bond or partially bond the fibers together.

Any insect such as grain borer, flour beetles, red rust beetles, larvae or worms which may pass through the interstices between the joints of the liner boards 7 are enmeshed and trapped in a web of the dense, mobile fibers and will be injured, confined and die at the exterior portion of the barrier.

As previously recited, due to the various vibrations to which the barrier is subjected an actual filter system is provided which of the dense, intermatted nature, excludes and/or picks up on the surface area of the liner, any few insects and larvae which may penetrate between the tongue and groove interstices of the liner. However, due to the highly expansive and mobile nature, the actual fibrous material in a short time, expands to actually fill such interstices in the liner boards.

In actual use in several thousands of railroad boxcars my improved system has been effective to prevent in such installations, any passage of insects, larvae through the barrier to the steel corrugated ends of the car. Many cars have been inspected and the liners and barrier partially removed and in every such instance where the installation was made in accordance with my invention, there was no penetration of insect larvae or worms through such barrier. Furthermore, the barrier positively excluded penetration of fine dust, dirt and other material.

Scientific examination of insects and barriers where my system has been carried out, leads me to believe that in addition to the webbed immobilizing of the insects, the extremities and individual fibers damage the thinly chitinized, articulations of the insects at the joints, causing escape of body fluids which are vital to insect life.

From the foregoing description, it will be seen that I have provided a simple and highly efficient method and system for substantially preventing colonization and breeding of insects in transportation cars, bins, trucks and the like where grain, milled products and other food stuffs and mixtures are contained for transportation and storage. My system and method provides a highly efficient, tensioned, resilient, fibrous barrier producing through mobility of the loose fibers, filtering action for dust and dirt and positively causing immobilizing and trapping of insects and larvae.

It will of course be understood that various changes may be made in the form, details, arrangement and proportions of the parts without departing from the scope of my invention.

What is claimed is:

1. An insect destroying barrier, said barrier comprising fixed spaced and rigid supporting bodies of substantial surface area and a densely matted stratum of resilient unbonded mobile fibers of siliceous material, said stratum of material being disposed over and between the opposing surface areas of the supporting bodies and being evenly compressed throughout the entire extent of said opposing areas to at least three times its original density before compression of approximately 3 pounds to the cubic foot whereby the fibers are tensioned and at the same time have a degree of relative mobility for effecting encasement, immobilization and destruction of any insect larvae attempting to penetrate through the stratum.

2. The invention according to claim 1, wherein the said fibers are glass and are relatively long and include myriads of sharp extremities which function in the destruction of insect larvae by puncturing the thinly chitinized articulations of the insects.

3. The method of forming an insect destroying barrier, said method comprising providing a first wall member, applying over one side face thereof a mat of resilient unbonded mobile fibers of siliceous material having a density as applied of approximately 3 pounds to the cubic foot, fixing the mat in the applied position on the wall member, then placing over and against the mat a second wall forming member and coupling the latter member to the first member in a spacial relation with the first member such as to compress the entire area of the mat to a density approximately three times the said density of the mat as applied to the first wall member.

4. The method of forming an insect destroying barrier, said method comprising providing a first rigid wall member, applying over one side face thereof a mat of resilient unbonded mobile fibers of siliceous material having a density as applied of approximately 3 pounds to the cubic foot, fixing the mat in the applied position on the wall member, then placing over and in direct contact with the mat a second rigid wall member of a material capable of transmitting air or vapor and coupling the latter member to the first member in a special relation with the first member such as to compress the entire area of the mat to a density approximately three times the said density of the mat as applied to the first wall member.

5. A method of barring passage through and entrapping and destroying insects in a structure subject to insect infestation and subjected to vibration and which structure embodies spaced wall members, which method comprises covering the inner surface of one of said members with a blanket of closely matted loose siliceous fibers having a density of approximately 3 pounds per cubic foot and which fibers are discrete to have free movement relative to one another, and then placing the other wall member against the fiber blanket and compressing the blanket throughout its entire area by said other wall member between the wall members to a density of at least three times the original density thereof and securing the wall members together to retain the blanket under such increased density and the fibers in tensioned movable relation whereby vibrations to which the structure may be subjected effect movement of the fibers to positions of lesser tension and continue such mobility to encase, immobilize and destroy insects and larvae endeavoring to enter the barrier.

References Cited in the file of this patent

UNITED STATES PATENTS

| | | |
|---|---|---|
| 1,980,754 | Henning et al. | Nov. 13, 1934 |
| 2,160,001 | Saborsky | May 30, 1939 |
| 2,174,988 | Lundvall | Oct. 3, 1939 |